(12) United States Patent
Minghetti et al.

(10) Patent No.: US 12,064,914 B2
(45) Date of Patent: Aug. 20, 2024

(54) APPARATUS AND METHOD TO FORM HOLLOW CONTAINERS

(71) Applicant: ALPHAMAC S.R.L., Bologna (IT)

(72) Inventors: Moreno Minghetti, Principality of Monaco (MC); Roberto Mentini, Granarolo dell'Emilia (IT); Antonio Martina, Castel Maggiore (IT)

(73) Assignee: ALPHAMAC S.R.L., Bologna (IT)

( * ) Notice: Subject to any disclaimer, the term of this patent is extended or adjusted under 35 U.S.C. 154(b) by 179 days.

(21) Appl. No.: 17/614,990

(22) PCT Filed: May 21, 2020

(86) PCT No.: PCT/IT2020/050131
§ 371 (c)(1),
(2) Date: Nov. 29, 2021

(87) PCT Pub. No.: WO2020/240604
PCT Pub. Date: Dec. 3, 2020

(65) Prior Publication Data
US 2022/0242033 A1 Aug. 4, 2022

(30) Foreign Application Priority Data

May 31, 2019 (IT) .......................... 102019000007764

(51) Int. Cl.
*B29C 49/48* (2006.01)
*B29C 49/04* (2006.01)
(Continued)

(52) U.S. Cl.
CPC ...... *B29C 49/4817* (2013.01); *B29C 49/0412* (2022.05); *B29C 49/42442* (2022.05);
(Continued)

(58) Field of Classification Search
CPC .......... B29C 49/4278; B29C 49/42808; B29C 49/0412; B29C 49/4817; B29C 49/46;
(Continued)

(56) References Cited

U.S. PATENT DOCUMENTS 3,846,531 A * 11/1974 Reilly ..................... B29C 49/74
264/533
4,170,622 A 10/1979 Uhlig
(Continued)

OTHER PUBLICATIONS

International Search Report and Written Opinion of PCT/IT2020/050131 dated Oct. 21, 2020, 8 pages.

*Primary Examiner* — Monica A Huson
(74) *Attorney, Agent, or Firm* — RANKIN, HILL & CLARK LLP (57) ABSTRACT

Apparatus for forming hollow containers (110), suitable to contain in particular one or more liquid or semi-liquid food products, starting from parisons (F) made of thermoplastic material. The apparatus comprises a matrix (11) defined by a pair of molds (12) cooperating with each other to define a cavity (13) shaped like the container (110) to be formed, and to define a support channel (14), configured to define an additional portion (112) of said container (110). The apparatus also comprises a forming punch (17), operatively mobile through said support channel (14) to enter into/exit from said cavity (13) so as to thrust and blow one of said parisons (F) against the walls of said cavity (13) to form at least said container (110).

12 Claims, 3 Drawing Sheets

(51) Int. Cl.
 *B29C 49/42* (2006.01)
 *B29C 49/46* (2006.01)
 *B29L 31/00* (2006.01)

(52) U.S. Cl.
 CPC .... *B29C 49/4278* (2013.01); *B29C 49/42808* (2022.05); *B29C 49/46* (2013.01); *B29L 2031/7158* (2013.01)

(58) Field of Classification Search
 CPC .......... B29C 49/4802; B29C 49/42442; B29C 2949/077; B29C 49/4273; B29C 49/76; B29C 49/4823; B29C 2049/4805; B29C 49/04; B29C 2049/4679; B29C 2049/4697; B29K 2067/003; B29L 2031/7158
 See application file for complete search history.

(56) References Cited

U.S. PATENT DOCUMENTS

| | | | | |
|---|---|---|---|---|
| 4,390,338 A | * | 6/1983 | Bowers | B29C 49/76 |
| | | | | 425/525 |
| 2006/0249887 A1 | | 11/2006 | Maddox | |
| 2015/0239594 A1 | * | 8/2015 | Batema | B65B 55/10 |
| | | | | 53/426 |
| 2017/0239873 A1 | | 8/2017 | Hatakeyama et al. | |
| 2017/0326778 A1 | | 11/2017 | Pagliarini | |

\* cited by examiner

APPARATUS AND METHOD TO FORM HOLLOW CONTAINERS

FIELD OF THE INVENTION

The present invention concerns an apparatus for forming hollow containers in particular intended to contain inside them liquid or semi-liquid food products, with a short or medium shelf-life.

In particular, the containers are made of thermoplastic polymeric material, with a technological process commonly known in the sector as extrusion-blow molding, and are particularly suitable to contain liquid or semi-liquid food products—for example milk, wine, fruit juices, ready-made food—but more generally any liquid or semi-liquid product whatsoever that requires an adequate degree of preservation.

The present invention also concerns the method to form the hollow containers as above.

BACKGROUND OF THE INVENTION

Within the food industry and the sale of related products, it is known there is a need, especially in the case of perishable liquid or semi-liquid products—such as milk, wine, fruit juices, ready-made food or suchlike—to guarantee they are preserved in suitable containers.

In the case of so-called "fresh" liquid or semi-liquid food products, especially of animal origin such as milk, the choice of the type of container is very important to maintain the organoleptic and chemical properties of the product and to ensure that it is edible in the short, medium or long term.

Especially if the liquid or semi-liquid product is milk of animal origin, the choice of the most suitable container and the corresponding closing means of this container has to comply with the shelf-life expected for the product. With the term "shelf-life" we mean the period of time during which the product can be kept in determinate conditions of preservation so that the quality and safety remain unchanged. In particular, the shelf-life depends on numerous factors, for example the production process, the type of packaging, the conditions of preservation and the substances present in a determinate product. Normally, the user is informed of the expected duration of the "shelf-life" by putting a date on the container, which represents the expiry date by which the product has to be consumed.

Typically, liquid or semi-liquid products can have a short shelf-life, that is, about one week, a medium shelf-life, that is, about two or three weeks, or a long shelf-life, that is, about 16-48 weeks. For example, depending on the treatment cycles that it undergoes, milk is divided into fresh pasteurized milk, which can have a shelf-life of about 7 days from the packaging date, in particular 6 days plus one packaging day, so-called microfiltered milk which can have a shelf-life of about 15-20 days from the packaging date, in particular 21 days, and long-life UHT milk—Ultra High Temperature—which can have a shelf-life of about 4-12 months from the packaging date.

The liquid or semi-liquid products are typically packaged and preserved in hollow containers made in the form of bottles, made of a plastic that is suitable for contact with food, that is, which does not contain molecular constituents that can migrate, by contact, into the food to be preserved. Depending on the type of liquid or semi-liquid product and its shelf-life, the plastic bottle can have suitable closing means which cooperate with the neck of the bottle to guarantee the desired preservation of the product.

In the case of liquid or semi-liquid products with a short shelf-life, such as pasteurized fresh milk, the neck of the bottle is suitably shaped and internally calibrated, and the perfect coupling between the cap, advantageously of the screw type, and the neck of the bottle, correspondingly threaded, is sufficient to guarantee the seal necessary to prevent bacterial proliferation in the short term. In this case, at the end of the container production process, the latter is ready to be introduced into a filling machine with the neck of the container completely open and ready to receive a liquid or semi-liquid product.

In the case of liquid or semi-liquid products with a medium shelf-life, such as for example microfiltered milk, a greater cleaning of the container is required, which has to be kept closed until a few moments before entering the filling machine, in order to decrease the risk of bacterial contamination.

Consequently, the container is made with an upper closing portion that defines what, in the sector, is called dome. The dome is configured to keep the neck of the container closed, which will subsequently be opened by a cutting operation that separates the dome from the neck of the container, the moment the container enters the filling machine or immediately before the step of filling the container with a liquid or semi-liquid product.

The neck of the container, therefore, cannot be internally calibrated and a traditional cap cannot be used to close it because this would not guarantee the container the necessary protection against bacterial infiltration.

Due to this configuration, it is necessary to apply an additional closing mean to the cap, in correspondence with the mouth of the container. For example, if the container is a bottle, the additional closing mean is applied in correspondence with the neck of the bottle in order to hermetically close the mouth of the container during the period between the steps of packaging/distribution and final use. In this way, thanks to the presence of the additional closing mean, the aim is to prevent unwanted biological transformations from occurring in the product contained inside the bottle, which can lead to the proliferation of bacteria, molds and fungi that are very harmful to human health. This additional closing mean is usually a sheet of food-grade aluminum which is welded to hermetically cover the mouth of the container.

The problem is similar in the case of liquid or semi-liquid products with a long shelf-life, such as for example UHT long-life milk. In this case, in addition to the application of the auxiliary closing means as above on the mouth of the container, as described above, it is required that the entire packaging process of the product take place in a completely aseptic environment since the permanence times of the product before it is consumed can be even very long, and since these products are not transported and stored in the cold chain, unlike those previously described.

One of the disadvantages of containers for packaging products with a medium shelf-life, such as for example microfiltered milk, is that the plant or machine for filling these containers has to provide a station for sealing/applying the sheet of aluminum. This entails high plant costs and a greater number of steps which determines a greater complexity of the production cycle, as well as a decrease in the overall efficiency of the production line and an increase in the time required to carry out the packaging. Furthermore, the cost of the sheets of aluminum to be applied on the containers significantly affects the unit cost of the product, thus determining a rather significant additional cost item.

One disadvantage of containers for packaging products with a medium shelf-life, such as microfiltered milk, is that the end user has to unseal the container before using it, an operation which is not always trivial because the sheet of aluminum may not have gripping flaps that facilitate opening. In addition, once removed, the sheet of aluminum has to be properly disposed of for appropriate disposal as waste, which entails another task for the end user compared to the disposal of the plastic container only.

Another disadvantage is that the neck of the container, once the sheet of aluminum is removed, does not ensure any hermetic seal with the "secondary cap" applied during the production step after the filling step, with consequent product losses if the container is not placed in an upright position, for example in the refrigerator and/or on a support surface.

Figure 1:
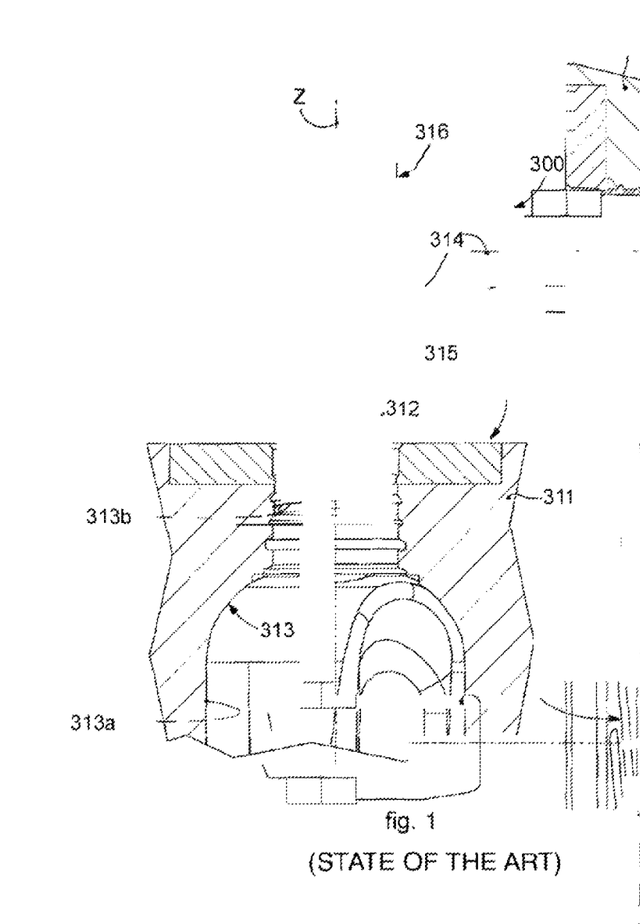
FIGS. 1 and 2 are schematic section views of an apparatus for forming containers of a type known in the state of the art, shown in two different operating configurations.
Figure 2:
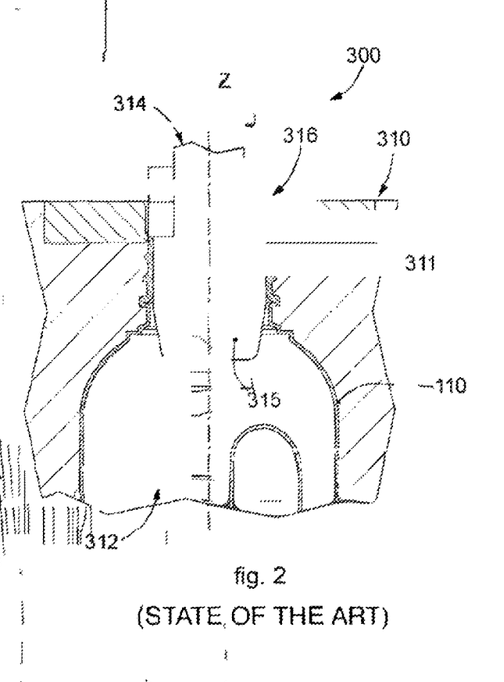

Known apparatuses for forming hollow containers by means of extrusion-blow molding technology, in particular for forming plastic bottles for packaging a liquid or semi-liquid product with a short shelf-life, such as for example fresh pasteurized milk, are described in FIGS. 1-2. The apparatus 300 comprises a metal matrix 310 defined by two molds 311 symmetrical with respect to a coupling plane and shaped according to the shape of the container 110 to be made, for example a bottle. The molds 311 are mechanically moved by a closing device and are coupled, enclosing inside them a tube made of thermoplastic material, in technical jargon called "parison", which has a determinate melting temperature, for example of about 200° C. The coupling of the molds 311 defines a cavity 312, which has an internal surface 313 which outlines the shape of the container 110 to be made. The internal surface 313 comprises a first portion 313a, which defines the portion of cavity 312 which, during use, will form the part of the container intended to contain the liquid or semi-liquid product, and a second portion 313b, in particular the calibrated internal diameter of the portion 313b, which will define the neck of the container 110, in this case a bottle, which during use will cooperate with the cap. The apparatus 300 is provided with a forming punch 314, configured to be inserted inside the cavity 312, being hollow inside in order to allow the passage of a compressed gas, for example air, which provides to expand the parison which, consequently, adheres to the walls of the cavity 312, assuming its shape. The forming punch 314 is provided with a terminal portion 315, configured to be introduced inside the cavity 312 in order to thrust the material of the parison against the walls of the mold portion 312b, and at the same time to blow air into the parison, and a cutting ring 316 configured to allow the cutting to size of the second portion 313b defining the neck of the container 110 which, during use, will cooperate with the cap to ensure the necessary seal. This completely traditional process allows to produce a container with an open neck, without any protection whatsoever against external contamination and suitable to be sealed with a cap.

Known apparatuses for forming hollow containers, in particular for forming plastic bottles for packaging a liquid or semi-liquid product with a medium shelf-life, such as for example microfiltered milk, are substantially similar to those just described, with the exception that the second portion defining the neck of the bottle is intermediate between the first portion as above and a third portion that defines what, in the sector, is called dome. Once the bottle is extracted from the matrix, the third portion, open toward the outside, is sealed so as to keep the cavity separate from the external environment. When it is necessary to fill the bottle, the third portion is removed by means of a cutting operation which defines an annular support lip on the second portion, suitable to support the sheet of aluminum as above. Currently, these types of apparatuses do not allow to define a geometry (in particular, calibrated sizes) of the neck of the bottle that allows to guarantee the preservation of products with a medium shelf-life, with only the cooperation of the screw cap.

There is therefore the need to perfect an apparatus for forming hollow containers that can overcome at least one of the disadvantages of the state of the art.

In particular, one purpose of the present invention is to provide an apparatus for forming hollow containers for containing products with a short and medium shelf-life which allows to avoid applying an additional closing mean, for example, a sheet of aluminum, on the mouth of the containers and at the same time guarantees the correct preservation of these products for the entire duration expected.

Another purpose of the present invention is to provide an apparatus for forming hollow containers which allows to reduce the packaging times of a liquid product with a short and medium shelf-life.

Another purpose of the present invention is to provide an apparatus for forming hollow containers for containing products with a short and medium shelf-life which can be assigned to a single type of differentiated waste disposal, for example plastic recycling, since no component is provided that is made of another material that cannot be disposed of in a differentiated manner.

Another purpose of the present invention is to provide an apparatus for forming hollow containers for containing products with a short and medium shelf-life which allows to reduce the costs of packaging the products.

Another purpose is to perfect a method to form hollow containers for containing products with a short and medium shelf-life which allows to avoid applying an additional closing mean, for example a sheet of aluminum, on the mouth of the containers and at the same time guarantees the correct preservation of these products for the expected duration.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, an apparatus to form hollow containers suitable to contain in particular one or more liquid or semi-liquid food products starting from a parison made of thermoplastic material, comprises a matrix defined by a pair of molds cooperating with each other to define a cavity, having the shape of the container to be formed, and a support channel, configured to form an additional portion of the container intended to be removed to allow the container to be filled.

The support channel is connected to the cavity in correspondence with a connection zone and is provided with an aperture, on the opposite side with respect to the cavity, in communication with the outside.

The apparatus also comprises a forming punch configured to thrust and blow the parison against the walls of the cavity to form the container and against the walls of the support channel to form the additional portion. The forming punch has an extension in the direction of a longitudinal axis and is operatively mobile, in a direction parallel to the longitudinal axis, through the support channel to enter into/exit from the cavity.

The forming punch comprises a thrusting end portion configured to be introduced into the cavity and to contact the container in the process of being formed, at least in correspondence with the connection zone, so as to confer a desired size on it.

The forming punch also comprises a cutting portion, positioned upstream of the thrusting end portion, to delimit the parison in correspondence with the aperture.

The forming punch also comprises an auxiliary portion, interposed between the thrusting end portion and the cutting portion, and configured to allow the thrusting portion to reach and contact the connection zone and to thrust and blow the parison against the walls of the support channel to form the additional portion.

Some embodiments also concern a semi-finished product comprising a container formed with the apparatus described above. The semi-finished product has a development along the longitudinal axis and comprises, in addition to the container as above, an additional portion, connected to a first end of the container and closed at a second end, opposite to the first end.

The additional portion comprises a first zone, adjacent to the first end, and a second zone, adjacent to the second end. The first zone has a compressive tension state, in a direction parallel to the longitudinal axis, greater than the compressive tension state, in a direction parallel to the longitudinal axis, of the second zone.

Embodiments of the present invention also concern a method to form hollow containers suitable in particular to contain one or more liquid or semi-liquid food products, starting from a parison made of thermoplastic material. The method comprises:
  a step of positioning a parison in the matrix defined by a pair of molds cooperating with each other to define the cavity, shaped like the container to be made, and a support channel, configured to define an additional portion of the container intended to be removed to allow the container to be filled, the support channel being connected to the cavity in correspondence with a connection zone and being provided with an aperture, on the opposite side with respect to the cavity, in communication with the outside;
  a step of introducing a forming punch, in a direction parallel to the longitudinal axis, through the support channel in the cavity, to thrust and blow the parison against the walls of the cavity to form the container, and against the walls of the support channel to form the additional portion, the forming punch having an extension in the direction of the longitudinal axis and being provided with a thrusting end portion which is introduced into the cavity; wherein at the end of the introduction step, the thrusting end portion contacts the container in the process of being formed, at least in correspondence with the connection zone, to confer a desired size on it, and a cutting portion of the forming punch, positioned upstream of the thrusting end portion, delimits the parison in correspondence with the aperture, and an auxiliary portion of the forming punch which is interposed between the thrusting end portion and the cutting portion, to allow the thrusting portion to reach and contact the connection zone so as to thrust and blow the parison against the walls of the support channel to form the additional portion;
  a step of extracting the forming punch from the cavity through the support channel in a direction parallel to the longitudinal axis, when the forming of the container and the additional portion is completed.

According to another aspect of the present invention, a machine to produce semi-finished products is provided, comprising at least one forming station in which an apparatus for forming containers such as that described above is operatively provided, a sealing station for the semi-finished product positioned downstream of the forming station and, optionally, a cutting station for the semi-finished product positioned downstream of the sealing station and configured to separate the additional portion from the container.

DESCRIPTION OF THE DRAWINGS

These and other aspects, characteristics and advantages of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DESCRIPTION OF EMBODIMENTS

We will now refer in detail to the various embodiments of the invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Embodiments described using the attached drawings concern an apparatus for forming hollow containers intended to contain liquid or semi-liquid food products, indicated as a whole with reference number 10 in the attached drawings.

The apparatus for forming hollow containers, hereafter referred to as apparatus 10 for simplicity, is particularly suitable to form containers 110 starting from an extruded tube F, hereafter called parison F, made of thermoplastic material, by means of the widespread extrusion-blow molding technology.

Here and hereafter in the description, with the term parison we mean a hollow tube made of thermoplastic material obtained by extrusion. The parison has no thread and has approximately the same length as the finished product, or a slightly longer length than that of the finished product, in this case approximately the same height as the container to be made. Since the parison has approximately the same length as the container to be made, during the blow-molding step, which will be described in detail below, the parison undergoes an enlargement mainly in the radial direction.

In particular, the containers 110 formed by the apparatus 10 are suitable to contain liquid or semi-liquid food products—for example milk, wine, fruit juices, liquid or semi-liquid ready-made food—but more generally any liquid or semi-liquid product whatsoever that requires an adequate degree of preservation and a shelf-life of an medium-lasting product, for example 2-3 weeks. According to a particular example of use, the apparatus 10 is particularly suitable to make bottles intended to receive pasteurized fresh milk with a shelf-life of 7 days, or microfiltered milk with a shelf-life of 21 days.

Figure 3:
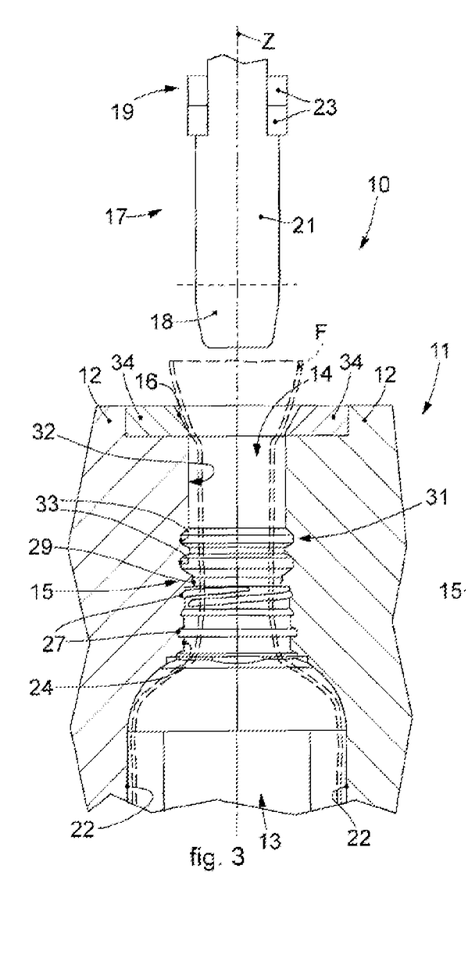
FIGS. 3-5 are schematic section views of embodiments of an apparatus for forming containers in accordance with the teachings of the present invention, shown in three different operating configurations, in which both the preform intended to form the container (FIGS. 3 and 4) and also the container being formed (FIG. 5) are also visible.
Figures 4, 5, 5A:
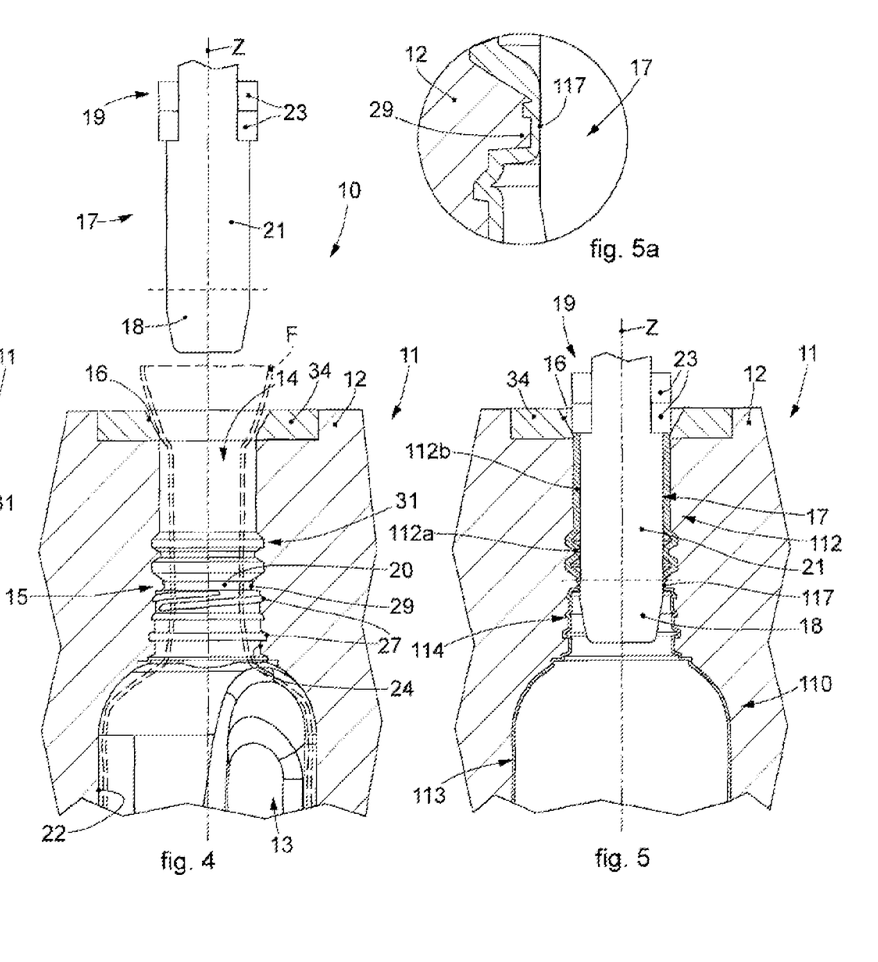
FIG. 5a is an enlarged detail of FIG. 5.

In accordance with some embodiments, shown in FIGS. 2-4, the apparatus 10 comprises a matrix defined by a pair of molds 12 cooperating with each other to define a cavity 13, which has the shape of the container 110 to be made, and to define a support channel 14, configured to define an additional portion 112 connected, at least temporarily, to the container 110. The additional portion 112 is intended, at a later time, to define the dome as above which will be sealed and subsequently removed to allow the container 110 to be filled, as will be described in more detail below.

The support channel 14 is connected to the cavity 13 in correspondence with a connection zone 15 and is provided with an aperture 16, opposite the cavity 13, in communication with the outside.

The apparatus 10 also comprises a forming punch 17 that has an extension in the direction of a longitudinal axis Z and is operatively mobile, in a direction parallel to the longitudinal axis Z, through the support channel 14 in order to enter into/exit from the cavity 13.

The forming punch 17 is provided with a thrusting end portion 18 configured to be introduced into the cavity 13 so as to thrust and blow a parison F against the walls of the cavity 13 to form at least the container 110.

The thrusting end portion 18 of the forming punch 17 is also configured to contact the container 110, in the process of being formed, at least in correspondence with the connection zone 15 to give it a desired size (FIG. 5).

The forming punch 17 also comprises a cutting portion 19, positioned upstream of the thrusting end portion 18, and suitable to delimit the parison F in correspondence with the aperture 16.

The forming punch 17 also comprises an auxiliary portion 21, interposed between the thrusting end portion 18 and the cutting portion 19, and configured to allow the thrusting portion 18 to reach and contact the parison F in correspondence with the connection zone 15 and to thrust and blow the parison F against the walls of the support channel 14 in order to form the additional portion 112 as above.

Figures 7, 8, 8A:
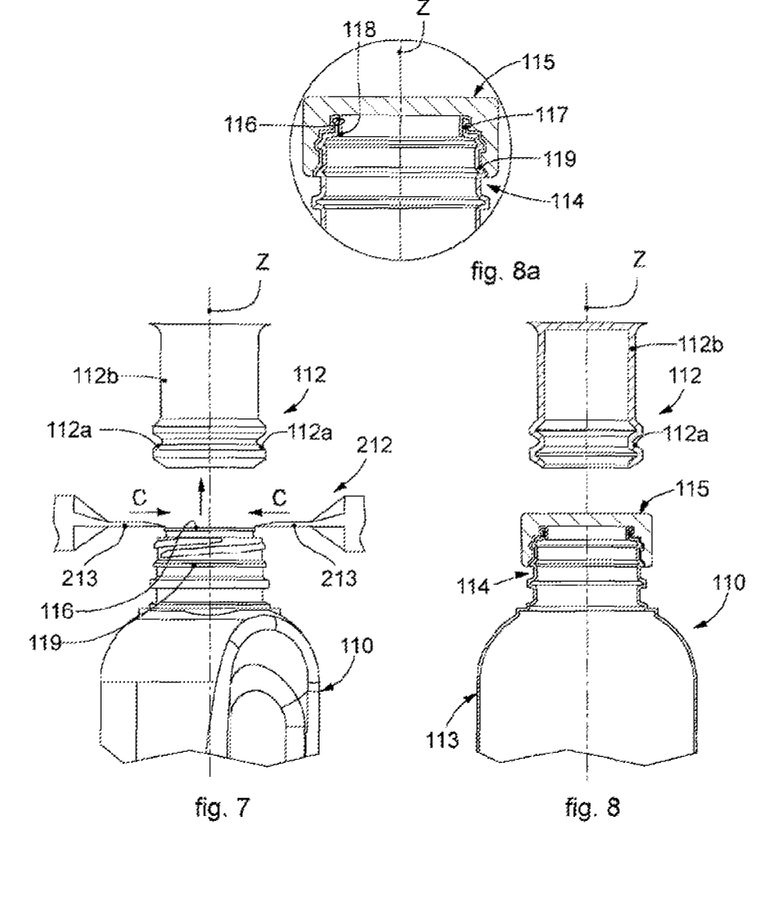
FIG. 8 is a schematic section view of the container and of the dome visible in FIG. 7, in which a closing cap is applied to the container.
FIG. 8a is an enlarged detail of FIG. 8.

According to some embodiments, better viewed in FIGS. 5 and 8, the container 110 comprises a hollow receptacle portion 113 suitable to contain the liquid or semi-liquid product and a coupling portion 114, with a substantially tubular shape, connected to the receptacle portion 113 and configured to cooperate with a closing mean 115. The container 110 is provided with a mouth 116 in correspondence with the coupling portion 114 which allows the receptacle portion 113 to communicate with the outside, in order to be filled or to be emptied during its use. In particular, the closing mean 115 is associated, during use, with the container 110 to guarantee the seal suitable for the correct preservation of the liquid or semi-liquid product contained inside it. Preferably, the closing mean 115 is such as to make the container 110 re-closable, such as for example a screw cap.

In accordance with some embodiments, the matrix 11 is defined by a pair of molds 12 facing each other and able to selectively couple in correspondence with a coupling plane passing through the longitudinal axis Z and, with particular reference to FIG. 3, orthogonal to the section plane of the matrix 11.

The molds 12 are reciprocally mobile away from/toward each other in order to allow the container 110 to be formed in the closed condition (molds 12 next to each other, FIG. 3) and the container 110 and the attached additional portion 112 to be extracted in the open condition (molds 12 away from each other, not shown). Advantageously, the molds 12 are cooled, for example by means of a heat transfer fluid, to allow to control the cooling curve of the material that the parison F is made of. In accordance with possible solutions, the heat transfer fluid is water with a temperature of approximately 4-6° C. and a pressure of approximately 3-4 bar. The convector fluid can circulate inside cooling pipes made in molds 12, not shown, which will not be described in detail here and are already known in the state of the art.

Each mold 12 has a containing wall 22 which defines, in cooperation with the containing wall 22 of the other mold 12, the part of the cavity 13 intended to define the receptacle portion 113 of the container 110, and a coupling wall 24 which defines, in cooperation with the coupling wall 24 of the other mold 12, the part of the cavity 13 intended to define the coupling portion 114 of the container 110.

In accordance with the embodiment shown in FIG. 3, the matrix 11 is defined by a pair of molds 12 specular with respect to the longitudinal axis Z which define a cavity 13 and a support channel 14 substantially axial-symmetric. In this case, the matrix 11 allows to form containers 110 without shaped grips or gripping protrusions which facilitate the lifting and rotation of the container 110 during its use.

In accordance with other embodiments, the matrix 11 is defined by a pair of specular molds 12, one of which is shown in FIG. 4, which have a coupling wall 22 suitably shaped to also define a grip of the container 110 suitable to facilitate the lifting and rotation of the container 110 during its use. Such containers 110, provided with a grip, are particularly suitable in the event their capacity, and therefore the quantity of liquid or semi-liquid product that they can contain, is significant, for example equal to half a gallon or one gallon.

In accordance with some embodiments, the cavity 13 comprises, in correspondence with the connection zone 15, a calibration portion 20 suitable to cooperate with the forming punch 17 and with the parison F so as to define in a desired manner at least the internal diametral size of the mouth 116 (FIG. 8*a*) of the container 110. In particular, in correspondence with the connection zone 15, the parison F is compressed by the forming punch 17 in a radial direction, which is substantially orthogonal to the longitudinal axis Z.

The calibration portion 20 is defined by a sealing segment 29 that has a height in a direction parallel to the longitudinal axis Z comprised between about 1 mm and about 10 mm, preferably between about 1.5 mm and about 4 mm. The sealing segment 29 is intended to define a sealing flap 117 of the mouth 116 of the container 110, which is ring-shaped. The sealing flap 117 cooperates, during use, with a sealing ring 118 of the closing mean 115, FIG. 8*a*, so as to ensure the seal necessary to preserve a liquid or semi-liquid product that has at least a shelf-life of low or medium duration, that is, that has a shelf-life of up to a few weeks, in particular up to about 2-3 weeks.

In accordance with some embodiments, shown in FIGS. 3-4, the coupling wall 24 has hollows 27 which define a profile intended to form a threaded zone 119 positioned on the external surface of the coupling portion 114 of the container 110. In accordance with the solution described here, the threaded zone 119 is intended to be engaged by the closing mean 115, in particular shaped as a screw cap provided, on its internal cylindrical surface, with a threaded portion suitable to engage with the threaded zone 119.

In accordance with some embodiments, shown in FIGS. 2-3, the support channel 14 has an oblong development along the longitudinal axis Z and comprises a first segment 31, in correspondence with the connection zone 15, and a second segment 32 connected to the first segment 31 and ending in correspondence with the aperture 16.

The first segment 31 is provided with expansion zones 33 substantially orthogonal to the longitudinal axis Z and configured to allow a homogeneous draw of the parison F by the forming punch 17. In particular, the expansion zones 33 can advantageously function as a unit for storing material during the forming process.

The second segment 32 is substantially smooth and has a tubular shape that connects to the aperture 16.

In accordance with some embodiments, shown in FIGS. 3-5, with each mold 12 of the matrix 11 there can be associated a contrast plate 34 which has a half-aperture that corresponds substantially to half the aperture 16. Advantageously, the contrast plate 34 can be made of a harder material than the material with which the molds 12 are made, since the zone adjacent to the aperture 16 is the one that can be more subject to rubbing or impacts due to the entry movement of the forming punch 17 into the cavity 13 through the support channel 14. Even more advantageously, each contrast plate 34 can have a flared surface in correspondence with the aperture 16 to limit the rubbing or impacts as much as possible.

In accordance with some embodiments, the forming punch 17 has an axial-symmetrical and elongated shape in the direction of the longitudinal axis Z.

The forming punch 17 is configured to pass from a first position, in which the forming punch 17 is outside the matrix 11 and does not cooperate with it, to a second position, in which the forming punch 17 cooperates with the matrix 11. In the second position the thrusting end portion 18 is in contact with the container 110, in the process of being formed, at least in correspondence with the connection edge 15, the auxiliary portion 21 is positioned to thrust and blow the parison F against the walls of the support channel 14 in order to form the additional portion 112, and the cutting portion 19 is positioned so as to delimit the parison F in correspondence with the aperture 16.

In accordance with some embodiments, shown in FIGS. 3-5, the forming punch 17 has a tapered cylindrical shape developing around the longitudinal axis Z and has an external diameter which is substantially slightly smaller than at least the internal diameter of the calibration ring 20. In this way, when the forming punch 17 passes from the first position to the second position it is suitable to draw the parison F in a direction parallel to the longitudinal axis Z. The parison F is therefore positioned in the interstitial zone that is defined between the cavity 13 and the forming punch 17 and between the support channel 14 and the forming punch 17.

The cutting portion 19 can comprise cutting and compression elements 23 protruding with respect to the auxiliary portion 21 in order to delimit the parison F in correspondence with the aperture 16.

According to some embodiments, not shown, the forming punch 17 can have on its external surface a plurality of holes suitable to allow the injection of a compressed gas, for example cooled air, in order to blow the parison F onto the walls of the cavity 13 and onto the walls of the support channel 14 to make respectively the container 110 and the additional portion 112, which is at least temporarily connected to the container 110. In the versions provided here, such holes, not shown, can be distributed homogeneously in the forming punch 17.

In accordance with possible embodiments, shown in FIGS. 3-4, the parison F, represented schematically with a dotted line, has a substantially tubular shape to allow the insertion of the forming punch 17 inside it.

The parison F can be made with an extrusion process in a station upstream with respect to the one in which the blow molding of the container 110 occurs, and can be subsequently positioned between the molds 12, when the molds 12 are moved away from each other, in an open condition.

The parison F can be made with a thermoplastic polymeric material, suitable for contact with food stuffs, chosen from a group comprising polyethylene, polypropylene, polyethylene terephthalate, polythene.

Preferably, the parison F is made of polyethylene, advantageously with high density polyethylene.

In accordance with one aspect of the present invention, the additional portion 112 of the container 110 comprises a first zone 112*a* in correspondence with the connection zone 15 of the support channel 14 and a second zone 112*b* in correspondence with the aperture 16 of the support channel 14 where the part of parison F which defines the first zone 112*a* has a compressive tension state, in a direction parallel to the longitudinal axis Z, greater than the compressive tension state, in a direction parallel to the longitudinal axis Z, of the part of parison F that defines said second zone 112*b*. In particular, the first zone 112*a* has a higher hardness than the second zone 112*b*.

Figure 6:
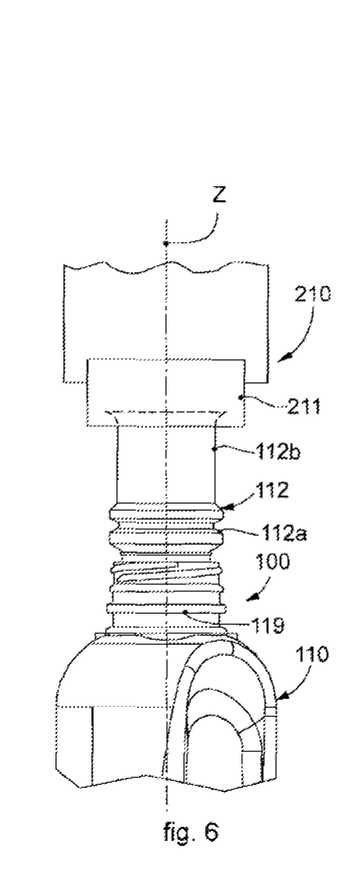
FIGS. 6 and 7 are front, three-dimensional and schematic views of working stations comprised in a machine comprising the forming apparatus of FIGS. 3-5, in which other operations carried out on the formed container are visible.

Embodiments described here, shown in FIGS. 6-8, also concern a semi-finished product 100 that has a development along a longitudinal axis Z and is formed by the container 110 and by the additional portion 112 which is connected with respect to a first end to the container 110 and is closed with respect to a second end, opposite the first end. The additional portion 112 comprises the first zone 112*a* in correspondence with the first end, and a second zone 112*b* in correspondence with the second end. The first zone 112*a* has a compressive tension state, in a direction parallel to the longitudinal axis Z, greater than the compressive tension state, in a direction parallel to the longitudinal axis Z, of the second zone 112b. In this way, the first zone 112a and the coupling portion 114 of the container 110 adjacent to it have improved mechanical resistance characteristics.

In accordance with some embodiments, a machine to produce a semi-finished product 100 comprises at least a forming station in which the apparatus 10 is operatively provided, a station to seal the semi-finished product 100 positioned downstream of the forming station and, optionally, a station to cut the semi-finished product 100 positioned downstream of the sealing station.

In particular, the cutting station is present if the machine to produce the semi-finished product 100 is directly connected with a plant for filling the containers 110 with a liquid or semi-liquid product. In this case, in fact, the additional portion 112 is separated from the container 110 in the cutting station so as to allow the container 110 to be filled with a liquid or semi-liquid product.

Otherwise, if the containers 110 are filled in another production plant, the machine allows to produce closed semi-finished products 100 intended to be transported to the location of the filling plant and, immediately before it, the cutting station that separates the additional portion 112 from the receptacle portion 113 to allow the latter to be filled.

In accordance with some embodiments, shown in FIG. 6, the sealing station can comprise a welding unit 210 configured to seal the additional portion 112 after the extraction of the container 110 and of the attached additional portion 112, that is, of the semi-finished product 100, from the matrix 11. Typically, the welding unit 210 is configured to intervene in a time interval of about 2-3 seconds after the extraction of the container 110 and of the attached additional portion 112, that is, of the semi-finished product 100, from the matrix 11. In such time interval, the material that the container 110 and the additional portion 112 consists of, that is, the material that the semi-finished product 100 consists of, although already solidified, still has a high temperature, for example equal to about 100° C., which is the temperature at which it is typically extracted from the matrix 11. In other words, the semi-finished product 100 arrives in the sealing station after the forming punch 17 has completely disengaged from the matrix 11, exiting from the cavity 13 and the support channel 14, and the molds 12 have been taken into an open condition.

The sealing station allows to increase the probability that, once the additional portion 112 has been sealed, the container 110, and in particular the receptacle portion 113, does not contain bacteria, which could contaminate the product with which the container 110 will be filled.

In an example embodiment, the welding unit 210 comprises a welding gripper 211 (schematically shown by the rectangle of FIG. 6) configured to selectively retain and release the additional portion 112 and in particular the second zone 112b of the additional portion 112. The welding gripper 211 is heated so as to seal, by melting and subsequent solidification, the additional portion 112 preventing, at least temporarily, access to the container 110 and, in particular, to the receptacle portion 113.

In accordance with some embodiments, shown in FIG. 7, the cutting station can comprise a cutting unit 212 configured to separate the additional portion 112 from the receptacle portion 113. The cutting unit 212 can comprise a pair of cutting elements 213 mobile with respect to each other in a cutting direction C substantially orthogonal to the longitudinal axis Z, indicated with an arrow in FIG. 7, and configured to separate the additional portion 112 from the container 110. In particular, the cutting elements 213 are configured to separate the additional portion 112 from the container 110 in correspondence with the zone positioned between the first portion 112a of the additional portion 112 and the sealing flap 117 of the coupling portion 114.

Embodiments described here also concern a method to form hollow containers suitable to contain one or more liquid or semi-liquid food products.

The method comprises a step of positioning a parison F in the matrix 11 defined by the pair of molds 12 cooperating with each other to define the cavity 13, which has the shape of the container 110 to be made, and a support channel 14 configured to define the additional portion 112 of the container 110. Subsequently, the method provides a step of introducing the forming punch 17, in a direction parallel to the longitudinal axis Z, through the support channel 14 into the cavity 13, in order to thrust and blow the parison F against the walls of the cavity 13 so that the thrusting end portion 18 contacts the container 110, in the process of being formed, at least in correspondence with the connection edge 15 to confer a desired size on it. Finally, the forming method according to the present invention provides a step of extracting the forming punch 17 from the cavity 13 through the support channel 14 in a direction parallel to the longitudinal axis Z, when the forming of the container 110 and of the additional portion 112 is completed.

According to some embodiments of the present invention, the method to form containers 110 can be executed within the context of a machine for producing semi-finished products 100, in accordance with the embodiments described above. In this case, a method is provided to produce semi-finished products in which after the method to form containers described above has been executed, a step of transferring the containers thus formed to a sealing station is provided, where these are sealed in the manner described above so as to produce such semi-finished products 100.

It is clear that modifications and/or additions of parts or steps may be made to the apparatus for forming hollow containers and corresponding method to form hollow containers as described heretofore, without departing from the field and scope of the present invention.

It is also clear that, although the present invention has been described with reference to some specific examples, a person of skill in the art shall certainly be able to achieve many other equivalent forms of apparatus for forming hollow containers and corresponding method to form hollow containers, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. Apparatus for forming hollow containers starting from parisons made of thermoplastic material, wherein the apparatus comprises a matrix defined by a pair of molds cooperating with each other to define a cavity shaped like the container to be formed, and a forming punch configured to thrust and blow a parisons to form said container within the pair of molds, said forming punch having a longitudinal extension along a longitudinal axis and being operatively mobile, in a direction parallel to said longitudinal axis, to enter into/exit from said cavity, said forming punch comprising a thrusting end portion configured to be introduced into said cavity and to contact said container during the formation thereof, so as to confer the container a desired shape, and a cutting portion, positioned opposite to said thrusting end portion to delimit said parison, wherein said pair of molds further comprises a support channel configured to form an additional portion intended to be removed from the container to allow said container to be filled, said support channel being connected to said cavity in correspondence with a connection zone disposed above a neck of the container, and being provided with an aperture, on the opposite side with respect to said cavity, in communication with outside, for entering and exiting of the forming punch, and wherein said forming punch further comprises an auxiliary portion, interposed between said thrusting end portion and said cutting portion, configured and dimensioned to be disposed along the support channel when the end portion of the forming punch reaches and contacts said connection zone during formation of the container.

2. Apparatus as in claim 1, wherein said auxiliary portion of said forming punch cooperates with said parison to define said additional portion provided with a first zone in correspondence with the connection zone of said support channel, and with a second zone in correspondence with said aperture of said support channel, wherein the part of said parison which defines said first zone has a compressive tension state, in a direction parallel to said longitudinal axis, greater than the compressive tension state, in a direction parallel to said longitudinal axis, of the part of said parison which defines said second zone.

3. Apparatus as in claim 1, wherein said connection zone comprises an annular calibration portion suitable to cooperate with said forming punch and with said parison so as to define at least one desired internal diameter size of the neck of said container.

4. Apparatus as in claim 3, wherein said annular calibration portion comprises a sealing segment substantially parallel to said longitudinal axis and having a height in the direction of said longitudinal axis comprised between about 1 mm and about 10 mm.

5. Apparatus as in claim 1, wherein said forming punch is configured to move from a first position, in which said forming punch is external to said matrix, to a second position, in which said forming punch cooperates with the matrix, wherein in said second position, said thrusting end portion is in contact with said container in the process of being formed, and wherein, at least in correspondence with said connection zone, said auxiliary portion is positioned to thrust and blow said parison against an internal wall of said support channel to form said additional portion above the neck of the container, and said cutting portion is positioned so as to delimit said parison in correspondence with said aperture.

6. Semi-finished product comprising a container formed with the apparatus of claim 1 and further comprising a body extending along a longitudinal axis, a neck and an additional portion which comprises a first zone connected to the neck of said container, and a second zone, opposite to the first zone, which is closed, wherein said first zone has a compressive tension state, in a direction parallel to said longitudinal axis, greater than the compressive tension state, in a direction parallel to said longitudinal axis, of said second zone.

7. Machine to produce a semi-finished product, wherein said semi-finished product comprises a container formed with the apparatus of claim 1 and an additional portion which comprises a first zone connected to said container, and a second zone, opposite said first zone, which is closed, wherein said first zone has a compressive tension state, in a direction parallel to said longitudinal axis, greater than the compressive tension state, in a direction parallel to said longitudinal axis, of said second zone, said machine comprising at least a forming station to form said semi-finished product, and a sealing station to seal said semi-finished product at the second zone of the additional portion.

8. Machine as in claim 7, wherein said sealing station comprises a welding assembly configured to seal said second end of said additional portion, following extraction of said container with the additional portion from said matrix.

9. Method to form hollow containers starting from parisons made of thermoplastic material, wherein said method comprises:
  a step of positioning one of said parisons in a matrix defined by a pair of molds cooperating with each other to define a cavity, shaped like the container to be made, and a support channel, configured to define an additional portion of said container intended to be removed to allow said container to be filled, said support channel being connected to said cavity in correspondence with a connection zone disposed above a neck of the container and being provided with an aperture, on the opposite side with respect to said cavity, in communication with the outside;
  a step of introducing a forming punch, in a direction parallel to a longitudinal axis, through said aperture of the support channel, into said cavity, to thrust and blow said parison against an internal wall of said cavity to form said container, and against the internal wall of said support channel to form said additional portion, said forming punch having an extension along said longitudinal axis and being provided with a thrusting end portion which is introduced into said cavity; wherein at the end of said introduction step, said thrusting end portion contacts said container within the cavity, a cutting portion of said forming punch, positioned opposite said thrusting end portion, delimits said parison in correspondence with said aperture, and an auxiliary portion of said forming punch which is interposed between said thrusting end portion and said cutting portion, reaches and contacts said connection zone; and
  a step of extracting said forming punch from said cavity through said support channel in a direction parallel to said longitudinal axis, when the forming of said container and of said additional portion is completed.

10. Method as in claim 9, wherein during said introduction step, said auxiliary portion of said forming punch cooperates with said parison to define said additional portion provided with a first zone in correspondence with the connection zone of said support channel and with a second zone in correspondence with said aperture of said support channel, wherein the part of said parison which defines said first zone has a compressive tension state, in a direction parallel to said longitudinal axis, greater than the compressive tension state, in a direction parallel to said longitudinal axis, of the part of said parison that defines said second zone.

11. Apparatus as in claim 1, wherein, in correspondence with said connection zone, said auxiliary portion of the forming punch compresses said parison in a radial direction, which is substantially orthogonal to said longitudinal axis.

12. Apparatus as in claim 4, wherein the sealing segment defines a sealing rim of the container, which is configured to cooperates with a corresponding sealing ring of a closing element.

* * * * *